(12) United States Patent
Wicker, Jr.

(10) Patent No.: US 9,674,007 B1
(45) Date of Patent: Jun. 6, 2017

(54) AUTOMATIC MULTIPLE INPUT MULTIPLE OUTPUT (MIMO) TRANSMITTER ORDER DETECTION

(71) Applicant: Ixia, Calabasas, CA (US)

(72) Inventor: David Jennings Wicker, Jr., Hillsboro, OR (US)

(73) Assignee: Ixia, Calabasas, CA (US)

( * ) Notice: Subject to any disclaimer, the term of this patent is extended or adjusted under 35 U.S.C. 154(b) by 0 days.

(21) Appl. No.: 14/988,700

(22) Filed: Jan. 5, 2016

(51) Int. Cl.
*H04B 7/04* (2006.01)
*H04L 25/03* (2006.01)
*H04L 5/00* (2006.01)
*H04L 27/26* (2006.01)
*H04B 7/0413* (2017.01)

(52) U.S. Cl.
CPC ..... *H04L 25/03019* (2013.01); *H04B 7/0413* (2013.01); *H04L 5/006* (2013.01); *H04L 27/2665* (2013.01)

(58) Field of Classification Search
CPC .......................... H04L 25/03019; H04B 7/0413
USPC .......................................................... 375/232
See application file for complete search history.

(56) References Cited

U.S. PATENT DOCUMENTS 8,559,543 B1 * 10/2013 Lee .................. H04B 7/0413
375/267
8,903,027 B1 * 12/2014 Wu .................. H04L 25/03318
375/341
9,083,454 B2 7/2015 Wicker, Jr. et al.
2015/0078477 A1 * 3/2015 Hong .................. H04L 27/2602
375/295

OTHER PUBLICATIONS

"IEEE Standard for Information technology—Telecommunications and information exchange between systems; Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6 GHz," IEEE Standards Association, IEEE Computer Society, IEEE Std 802.11ac, p. 1-425 (2013).

* cited by examiner

*Primary Examiner* — Michael Neff
(74) *Attorney, Agent, or Firm* — Jenkins, Wilson, Taylor & Hunt, P.A.

(57) ABSTRACT

Systems and methods are disclosed herein to provide automatic identification of radio frequency (RF) transmitter chains during the testing of wireless data communication devices and systems, including Multiple Input Multiple Output (MIMO) devices and systems utilizing beamforming. In accordance with one or more embodiments, a signal analysis function is disclosed that identifies the ordinal index of each MIMO RF transmitter chain associated with a Device Under Test (DUT) using the Cyclic Shift Delay (CSD) imposed on the transmitted MIMO signal. Such a system may offer improved capabilities such as automated detection of mis-cabled test setups, automated recovery from mis-cabling, and automated adaptation of transmitted test signals to counteract the effects of mis-cabling.

23 Claims, 6 Drawing Sheets

AUTOMATIC MULTIPLE INPUT MULTIPLE OUTPUT (MIMO) TRANSMITTER ORDER DETECTION

TECHNICAL FIELD

The subject matter described herein relates generally to the test and measurement of wireless data communication systems; and more particularly to systems and methods for testing RF devices and systems with multiple radios, including but not limited to multiple-input multiple-output data communication devices and systems.

BACKGROUND

Sophisticated wireless data communications devices, systems, and networks are bringing about the increasing need for higher data rates and the support of greater numbers of users and data traffic. As a consequence these networks employ techniques such as MIMO signal coding for achieving higher bandwidths, wherein multiple parallel radio frequency (RF) receiver and transmitter chains are used together to transmit a single data stream. Such techniques, however, increase the complexity of testing wireless devices. Manufacturers, vendors and users therefore have a greater need for better testing of such MIMO transmission systems.

Current state of the art in wireless technologies, such as the IEEE 802.11 WLAN protocol, support not only MIMO transmission and reception but also include advanced signal processing techniques such as beamforming. Beamforming improves the reception of transmitted MIMO signals at a particular MIMO receiver by pre-conditioning the transmitted signals to increase the signal-to-noise ratio (SNR) at that specific receiver's spatial location, while concurrently decreasing the signal-to-noise ratio at other locations where the signal is not desired to be received. Beamforming is accomplished by pre-processing transmitted signals using a precoding matrix selected according to the characteristics of the RF channel existing between the MIMO transmitter and the target MIMO receiver. The precoding matrix is structured to pre-emphasize specific paths between a set of transmit antennas at one spatial location and a set of receive antennas at a different spatial location. At the receiver, the MIMO decoding process will remove the effect of the precoding matrix, and thereby enhance the SNR for the given transmitted signal between those two spatial locations, while diminishing the SNR from other locations.

Figure 1:
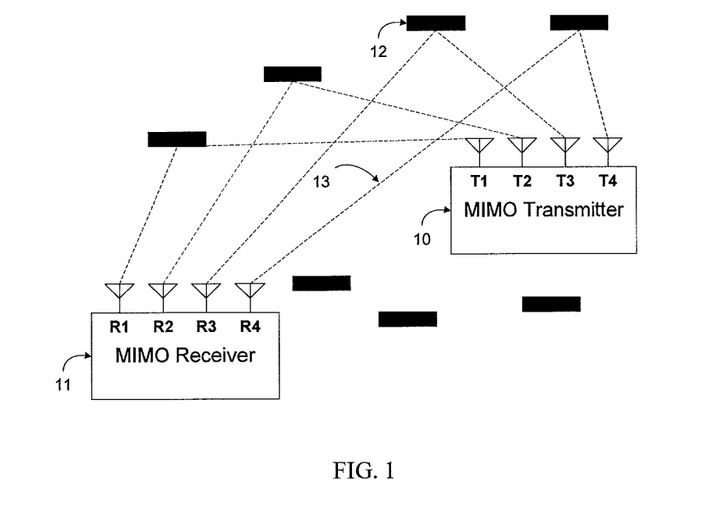
FIG. 1—representation of an "over the air" MIMO environment with receiver, transmitter and multiple scatterers.

With reference to FIG. 1, a representational view of a MIMO transmitter 10 and MIMO receiver 11 is shown in an "over the air" RF environment containing metallic scatterers 12. Multiple RF paths 13 are formed between the antennas of the transmitter and receiver due to the scatterers, enabling MIMO communications to take place. When MIMO systems are used in an "over the air" environment such as depicted in FIG. 1, the signals sent by the set of transmit antennas (after precoding) form a composite signal that is received by the set of receive antennas. The signal processing operations applied during the decoding process are structured such that they may be applied to the received composite signals in any order; there is no one-to-one correlation between a particular transmit antenna and a particular receive antenna.

Figure 2:
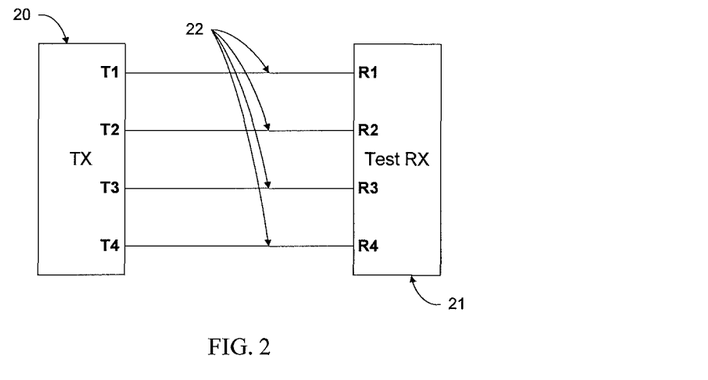
FIG. 2—representation of a cabled test environment with a MIMO transmitter and a MIMO test receiver coupled by RF cables.

However, when a MIMO system is placed in a test environment, where cables are typically used to interconnect receive and transmit antennas, the situation becomes different. FIG. 2 represents such a test environment, where MIMO transmitter 20 communicates with MIMO test receiver 21 using RF cables 22. As shown in the figure, the antennas are removed from the antenna ports of transmitter 20 and test receiver 21 (the ports being shown in the figure as T1, T2, T3, T4 and R1, R2, R3, R4 respectively). In this case there is a one-to-one correspondence between each RF transmitter antenna port and each RF receiver antenna port. In this case, the signal received by each receive antenna port is not a composite of all the signals, and hence there is a one-to-one correlation between a particular transmit antenna and a particular receive antenna that must be taken into account.

Figure 3:
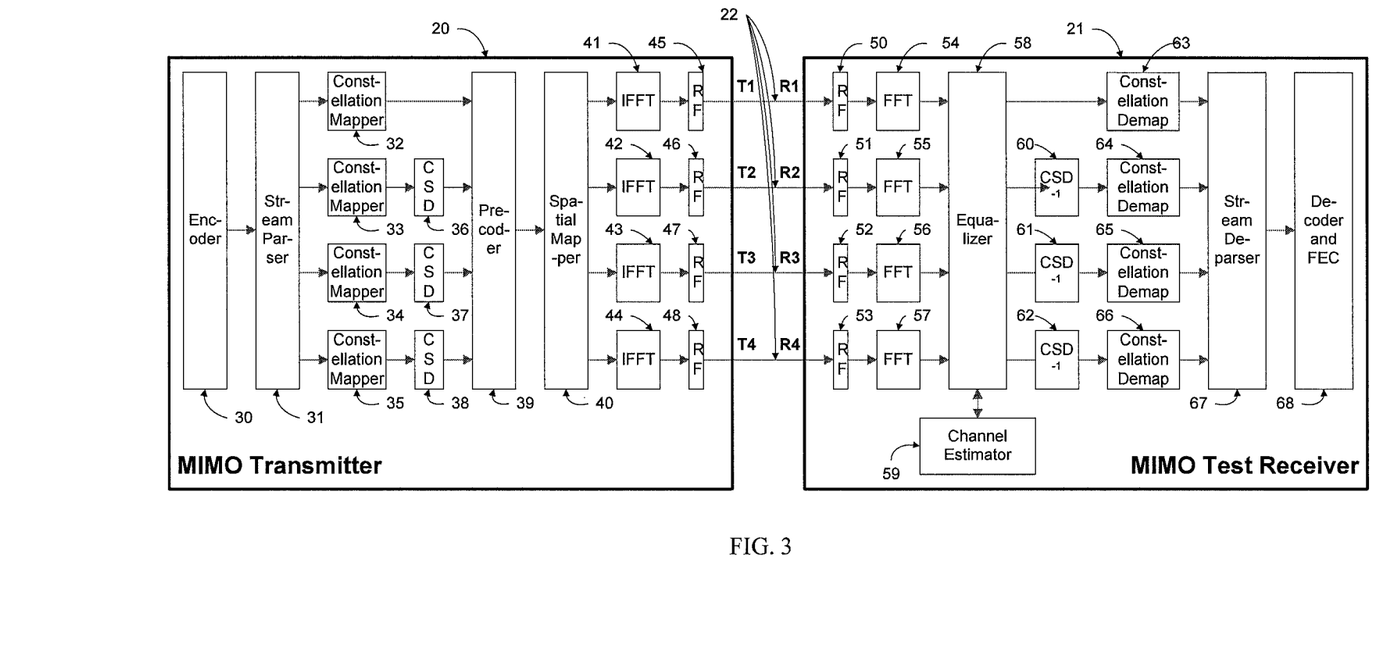
FIG. 3—block diagram of a MIMO transmitter coupled to a MIMO test receiver.

Turning now to FIG. 3, a partial block diagram of an Orthogonal Frequency Division Multiplexing (OFDM) MIMO transmitter 20 and a MIMO test receiver 21 interconnected by RF cables 22 is shown. MIMO transmitter 20 contains encoder 30 that encodes digital data with some type of error-correcting code such as a binary convolutional code (BCC), followed by stream parser 31 that splits the encoded data stream into multiple independent binary streams. Constellation mappers 32, 33, 34, 35 then perform digital modulation on the binary streams to create OFDM symbols. Cyclic shift delay (CSD) functions 36, 37, 38 delay some of these symbol streams by variable amounts, before passing them to transmit precoder 39 for performing beamforming precoding according to the measured characteristics of the RF channel. The precoded digital symbols are passed to spatial mapper 40, which implements the MIMO space/time mapping procedure, after which the data is processed by inverse Fast Fourier Transform (IFFT) units 41, 42, 43, 44 which transforms the data from the frequency domain to the time domain. Finally, the time domain signals are converted to analog RF outputs by RF transmit processors 45, 46, 47, 48 and transmitted on cables 22.

MIMO test receiver 21 receives the RF signals on cables 22 via RF receive processors 50, 51, 52, 53, which down-convert and digitize them to output baseband signals, which are in turn passed to FFT processors 54, 55, 56, 57 to transform them from the time domain to OFDM symbols on frequency domain subcarriers. The frequency domain signals are equalized by MIMO equalizer 58 to remove the effects of the RF channel, as measured by channel estimator 59, and then passed to constellation demappers 63, 64, 65, 66 to recover the original binary data streams. Some of these symbol streams are delayed by variable amounts using inverse CSD ($CSD^{-1}$) functions 60, 61, 62, compensating for the CSD 36, 37, 38 applied in MIMO transmitter 20. Finally, the individual binary data streams are combined using stream deparser 67 and then processed by decoder and FEC unit 68, which reverses the encoding applied at the transmitter and also corrects any bit errors that may be encountered, producing a copy of the original digital data supplied to MIMO transmitter 20.

The use of RF cables 22 to interconnect MIMO transmitter 20 to MIMO test receiver 21 is advantageous from the point of view of excluding unwanted interference and noise, reducing variable path losses encountered in "over the air" environments, and in general improve repeatability and controllability during testing. However, precoder 39 and CSD functions 36, 37, 38 impose certain specific characteristics on each transmitted symbol stream that are different from the other symbol streams; for example, signals transmitted on antenna port T1 in FIG. 3 must be received at antenna port R1, and so on. This is necessary so that receiver 21 can successfully decode and extract data from the various symbol streams.

As has been mentioned, in an "over the air" environment there are no RF cables interconnecting the MIMO transmitter and receiver, and all MIMO receiver ports receive a composite of the signals transmitted by each transmitter port. MIMO test receiver 21 is thus able to treat all of its antenna ports R1, R2, R3, R4 identically and rely on the channel estimation process to determine which antenna port belongs to which RF chain. However, in a cabled environment this is not the case.

Figure 4:
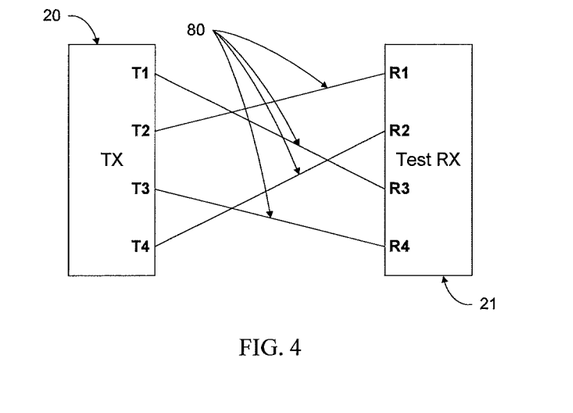
FIG. 4—depiction of a mis-cabling scenario between a MIMO transmitter and a MIMO test receiver.

Turning now to FIG. 4, an example of an inadvertent mis-cabling of RF cables 80 between MIMO transmitter 20 and MIMO test receiver 21 is shown. In this case, T1 on MIMO transmitter is connected to R3 on MIMO test receiver 21, and so on. This renders it difficult or impossible for MIMO test receiver 21 to successfully receive and decode the MIMO data, as the wrong CSD values and the wrong beamforming precoding matrix will be applied to the incoming signals under the assumption that the receive signals have a particular order corresponding to the expected transmit signals that would normally be coupled to the receiver ports.

Unfortunately it is not always simple to ensure that the interconnection between MIMO transmitters and test receivers follows the expected order. For example, the manufacturer of MIMO transmitter 20 may not mark the significance of the various antenna ports, under the expectation that during normal use these ports are connected to antennas for "over the air" operation. It may also be possible that testing may have to be performed on MIMO transmitters 20 with internally configured antennas (i.e., without easily accessible external antenna ports), in which case no labeling may exist. It may even be possible that the meaning of signal labels assigned by a particular manufacturer may not correspond to the meaning of the same signal labels assigned by some other manufacturer, as there is no known industry standard for labeling MIMO transmitter antenna ports. In all cases, the net result is that the test may fail because MIMO transmitter 20 is incorrectly connected to MIMO test receiver 21, as depicted for an exemplary case in FIG. 4.

It should be apparent that the issue of proper ordering also occurs in the reverse direction, i.e., from a MIMO test transmitter to a MIMO receiver under test. An aspect that should be noted, however, is that within a particular device the ordering of transmitted signals and received signals relative to the set of antenna connectors is the same; that is, if an antenna connector carries a particular segment of transmitted signal, such as for example that generated by IFFT 41 and RF transmit processor 45 in FIG. 3, then that antenna connector will also accept a corresponding segment of received signal, such as for example that accepted by RF receive processor 50 and FFT 54 in FIG. 3. Therefore, determining the order of transmitted signals will assist in determining the order of received signals.

The known prior art in the field of wireless device testing therefore suffers from serious shortcomings with regard to coupling a MIMO DUT to a MIMO wireless tester. There is hence a need for improved wireless MIMO test systems and methods. A test system that can automatically determine the assignment of transmit antenna ports to transmitted signals is desirable. It is preferable for such a system to automatically adapt to the ordering of transmitted signals, so as not to require an operator to recable or reconfigure the test setup. Finally, such a system should automatically generate transmitted signals to a DUT with the same ordering as the signals received from the DUT, thereby ensuring that two-way communications can be performed without recabling or reconfiguring.

SUMMARY

The subject matter described herein includes automatic MIMO transmitter order detection. According to one aspect of the subject matter described herein, a MIMO test receiver is provided. The MIMO test receiver is configured to connect to a MIMO transmitter, which may be a device under test. Alternatively, the device under test may be a MIMO device separate from the MIMO transmitter and the MIMO test receiver. The MIMO test receiver includes a plurality of receive processors for receiving MIMO signals transmitted over radio frequency (RF) cables and for converting the signals to baseband signals. The MIMO test receiver further includes a plurality of fast fourier transform (FFT) units for converting the baseband signals into frequency domain symbols carried on frequency domain subcarriers. The MIMO test receiver further includes a signal order detection and reordering function for determining an order in which the MIMO signals were transmitted over the RF cables and for automatically reordering the frequency domain subcarriers according to an expected transmission order.

According to another aspect of the subject matter described herein, a method for automatically reordering MIMO signals transmitted from a MIMO transmitter is provided. The MIMO transmitter may be a MIMO device under test or part of a test setup designed to test a MIMO device separate from the MIMO transmitter and the MIMO test receiver. The method includes receiving, by a plurality of receive processors in a MIMO test receiver, MIMO signals transmitted over radio frequency (RF) cables, and further for converting the signals to baseband signals. The method further includes converting, using a plurality of fast fourier transform (FFT) units, the baseband signals into frequency domain symbols carried on frequency domain subcarriers. The method further includes determining an order at which the MIMO signals were transmitted over the RF cables and automatically reordering the frequency domain subcarriers according to an expected transmission order.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

Note that like reference numbers are used to identify like elements illustrated in the different drawings.

DETAILED DESCRIPTION

Figure 5:
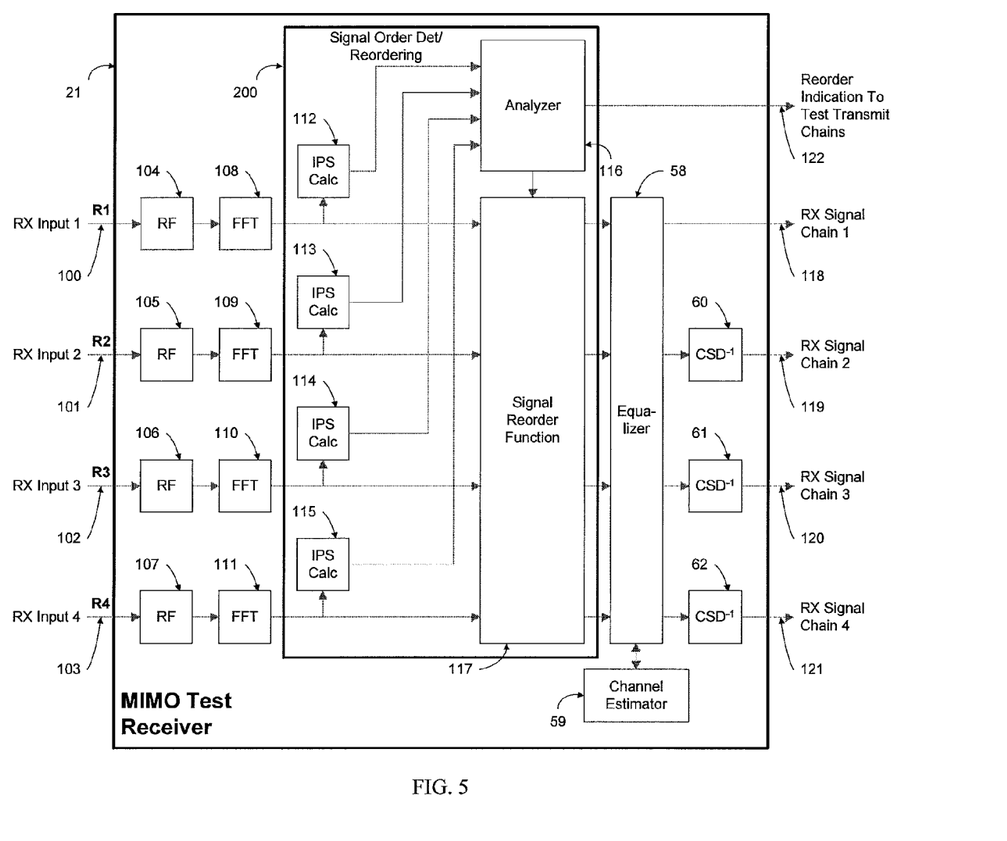
FIG. 5—partial block diagram of a MIMO test receiver with functions for detecting misordered signals and reordering them.

FIG. 5 shows a portion of a MIMO test receiver 21 with RF inputs 100, 101, 102, 103 (labeled for purposes of clarity as R1, R2, R3 and R4 respectively) feeding RF receive processors 104, 105, 106, 107 that convert the received RF signals to filtered digital baseband signals. The baseband signals are then fed to FFT units 108, 109, 110, 111 that perform time-domain to frequency domain conversion as part of the OFDM demodulation process, breaking the input signals into subcarriers. These frequency domain signals (sets of subcarriers) are fed through signal reorder function 117 to MIMO equalizer 58, which utilizes channel equalization matrices produced by channel estimator 59 to invert the effect of the RF channel on the received signals and extract the appropriate separate signal streams originally imposed at the transmitter. The outputs of equalizer 58 are fed to inverse CSD functions 60, 61, 62, which remove the CSD delays imposed at the transmitter to re-align the received signals prior to decoding constellations and de-parsing MIMO streams. The outputs of the inverse CSD functions are passed to the remainder of the MIMO test receiver via RX signal chain outputs 118, 119, 120, 121. The remainder of the MIMO test receiver functions follow standard MIMO processing algorithms (as depicted, for example, in FIG. 3) and will not be described here.

As may be observed from FIG. 5, the inverse CSD and (subsequent) stream deparsing functions assume a certain order for the signal streams passing through the various signal chains. Under normal circumstances with antennas attached to MIMO test receiver 21 RF inputs 100, 101, 102, 103, it is possible for MIMO equalizer 58 to appropriately extract these signal streams and feed them to the correct signal chains. However, when RF cables are used to interconnect MIMO test receiver 21 with a MIMO transmitter and a beamforming precoder matrix is applied, it may not be possible for equalizer 58 to extract the signal streams in the correct order. In this case, the inverse CSD and stream deparsing functions will be applied to the wrong streams and the output data cannot be recovered.

However, it is known that the MIMO transmitter will apply the CSD to the transmitted signal streams in a particular order; for example, the amount of CSD applied to the signal at antenna connector T2 in FIG. 3 will be different from the amount of CSD applied to the signal at antenna connector T4. Also, the signal at antenna connector T1 has no CSD applied at all. Different amounts of CSD manifest themselves as different phase shifts in the received signal. Therefore, analyzing the phase of each receive signal stream when a known predetermined data pattern is being transmitted, and deducing the various CSDs thereby, will permit the different transmitted signal streams to be unambiguously identified.

Predetermined data patterns are normally transmitted for MIMO signals as part of the training sequences that are utilized to estimate the channel conditions and determine clock frequency and phase offsets, among other functions. In the IEEE 802.11 protocol, for example, the Long Training Field (LTF) of each transmitted frame contains a fixed and well-known data pattern that is specifically intended for channel estimation and offset compensation. When the LTF is passed through FFT units 108, 109, 110, 111 and broken up into subcarriers, each subcarrier output by an FFT unit will have an incremental phase shift (IPS) that is different from the neighboring subcarrier by an amount proportional to the CSD applied. For example, a CSD of 1/N radians causes a phase shift of $2*\pi/N$ radians between each subcarrier. Therefore, detecting a residual IPS between subcarriers after compensating for errors such as clock offsets and sampling tolerances will provide an estimate of the CSD originally applied to the signal.

Once the CSD originally applied to each signal stream is known, it is possible (e.g., by reference to the IEEE 802.11 protocol specification) to determine the order in which these signal streams were originally transmitted by the MIMO transmitter, for instance transmitter 20 in FIG. 3. As an example, the signal intended to be sent to transmitter antenna connector T1 has no CSD applied at all, and hence there should be no IPS present in the subcarriers output by its corresponding FFT unit. Performing this process for all of the FFT units will provide an unambiguous indication of the order in which the transmitted signal streams are being received at the antenna connectors 100, 101, 102, 103. If they are out of order, it is then possible to reorder them into the correct order.

Referring again to FIG. 5, IPS calculation blocks 112, 113, 114, 115 implement the aforementioned IPS calculation on the subcarriers output by FFT units 108, 109, 110, 111 during the LTF, when the data have a known fixed pattern and consequently the CSDs can be estimated. It may be advantageous to calculate the IPS over all of the subcarriers for a given stream, or alternatively some large fraction of them, in order to provide a more accurate estimate. The outputs of IPS calculation blocks 112, 113, 114, 115 reflect the IPS estimates during the LTF, and are fed to analyzer 116, which compares the IPS values for all of the received signal streams and determines the order in which these signal streams must be placed so as to reflect their order as transmitted. Analyzer 116 then generates a reorder indication if required (i.e., if the signal streams are determined to be misordered) to signal reorder function 117. Signal reorder function 117 acts as a simple crossbar shifter that reorders the signal streams to correctly reflect their order as expected to be transmitted. Equalizer 58 and inverse CSD units 60, 61, 62 are now enabled to process and decode the received signals correctly.

In FIG. 5, IPS calculation units 112-115, analyzer 116, and signal reorder function 117 can be considered collectively as a signal order detection and reordering function 200. Also, IPS calculation units 112-115 and analyzer 116 can be considered collectively as a signal order detection function, in situations where only detection is desired.

Figure 6:
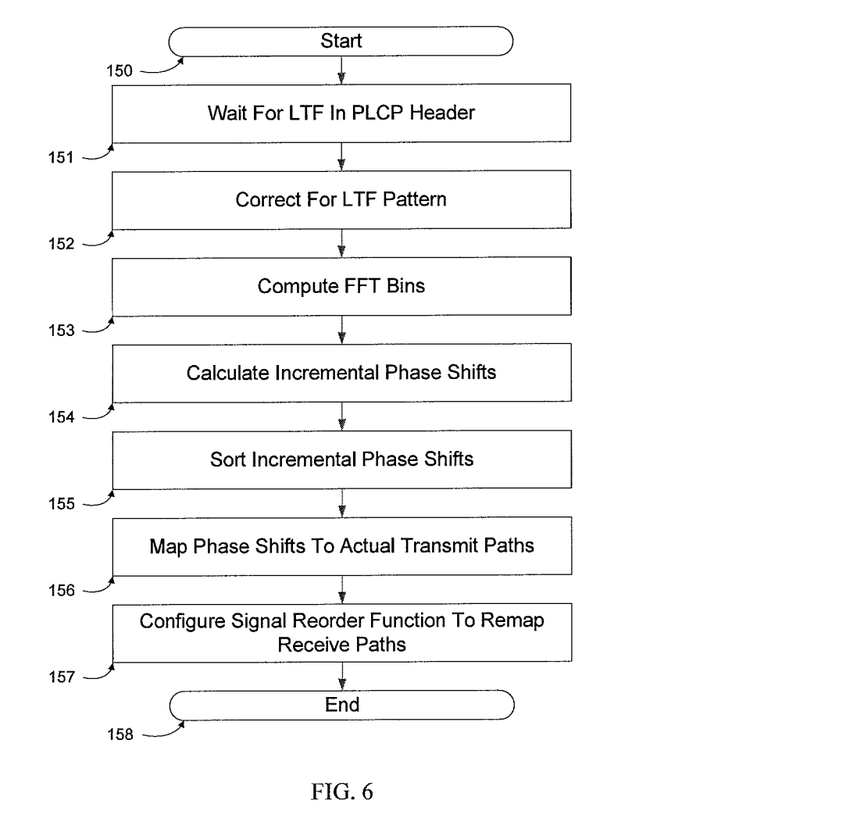
FIG. 6—illustrative flow chart for a method of detecting misordered signals, identifying their correct order, and reordering them.

With reference to FIG. 6, an illustrative flow chart of the misordering detection and reordering method is shown. The flow chart comprises the steps of:
1) At step 150, starting the process.
2) At step 151, waiting for a frame to be received, and further waiting for the LTF in the Physical Layer Convergence Protocol (PLCP) header of the received frame.
3) At step 152, correcting the input for the fixed, predetermined LTF pattern.

4) At step 153, computing the FFT bins for all of the subcarriers in all of the received signal streams.

5) At step 154, calculating the IPSs across some or all of the FFT bins, separately for each received signal stream.

6) At step 155, sorting the IPSs from least to greatest.

7) At step 156, mapping each IPS to the actual transmit path, according to the known CSD that is expected to be applied at the transmitter to each individual transmit path.

8) At step 157, configuring a signal reorder function to remap receive paths in order to remove the effects of any misordered cabling.

9) At step 158, ending the process.

It is common for a test transmitter and test receiver to share the same RF connectors, e.g., inputs 100, 101, 102, 103 of MIMO test receiver in FIG. 5 may be connected to the same set of RF connectors as a corresponding set of outputs from a MIMO test transmitter. An equivalent sharing of RF connectors may also occur on the DUT. If the RF cables connecting the DUT to the MIMO test receiver are misordered, then both the signals received from the DUT as well as the signals transmitted to the DUT will be identically misordered. It is therefore desirable to reorder the transmitted test signals to the RF connectors on the tester in a similar fashion to the received test signals.

Analyzer 116 may therefore also output a reorder indication 122 to the transmit chains of a possible associated MIMO test transmitter (not shown) that may form part of the test setup. The MIMO test transmitter may utilize a signal reorder function similar to that of signal reorder function 117 in FIG. 5 to reorder its transmitted signals after applying CSD precoding and spatial mapping, but before being transformed to the time domain and converted to analog. This enables a MIMO test transmitter to automatically follow the misordering detection performed by an associated MIMO test receiver and ensure that the proper signals are transmitted to a DUT, as well as being received from the DUT.

Finally, it may be useful to signal an operator of the test setup to the fact that the cables connecting the DUT to the tester have been misordered, or to record this as part of the test process. For example, during manufacturing test it may be desirable for the operator to be alerted when misordering has occurred in the cabling, as the operator may need to recable the system to achieve proper manufacturing test and calibration. It may also be useful to record the fact of mis-cabling for post-analysis of manufacturing test data to improve the manufacturing process. Therefore, analyzer 116 may output the reorder indication 122 to a status indicator (not shown) or for storage in some memory or database (also not shown).

In one example, reorder indication 122 may indicate how the cables have been misordered. For example, if the MIMO transmit ports are labeled T1-T4 and the corresponding MIMO test receiver inputs are labeled R1-R4, analyzer 116 may generate output indicating that transmit port T1 is connected to receive port R2, T2 is connected to R1, T3 is connected to R3, and T4 is connected to R4. Such output may be communicated in a sequence of bits or even via a graphical user interface to the test operator.

In one example, reorder indication 122 may serve as a misorder alert for alerting the test operator as to how the cables have been misordered. In the example where analyzer 116 outputs reorder indication 122 to transmit chains, the transmit chains may dynamically reorder signal transmission to compensate for the cabling error. Continuing with the example where T1 is connected to R2 and T2 is connected to R1, analyzer 116 may communicate this fact to the corresponding transmit chains, and the transmit chains may reconfigure transmission such that the signal for T1 is transmitted over T2 and the signal for T2 is transmitted over T1. Such dynamic reordering of transmitted signals eliminates the need for recabling and allows tests to automatically continue even when cables have not been correctly connected.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A multiple input multiple output (MIMO) test receiver, comprising:
   a plurality of receive processors for receiving MIMO signals transmitted over radio frequency (RF) cables and for converting the signals to a corresponding plurality of baseband signals;
   a plurality of fast Fourier transform (FFT) units for converting the corresponding plurality of baseband signals into frequency domain symbols carried on frequency domain subcarriers; and
   a signal order detection and reordering function for determining an order at which the MIMO signals were transmitted over the RF cables and for automatically reordering the frequency domain subcarriers according to an expected transmission order.

2. The MIMO test receiver of claim 1 wherein the signal order detection and reordering function includes a plurality of incremental phase shift (IPS) calculation blocks for estimating an incremental phase shift of the subcarriers output by the FFT units.

3. The MIMO test receiver of claim 2 wherein the IPS calculation blocks estimate the incremental phase shifts by detecting known data patterns in the subcarriers.

4. The MIMO test receiver of claim 3 wherein the known data patterns comprise long training field (LTF) patterns.

5. The MIMO test receiver of claim 2 wherein the signal order detection and reordering function utilizes the incremental phase shifts as an indicator of cyclic shift delays (CSDs) between the frequency domain subcarriers.

6. The MIMO test receiver of claim 2 wherein the signal order detection and reordering function includes an analyzer that detects an order of the transmitted signals using the estimated incremental phase shift of each subcarrier and a signal reorder function that reorders the subcarriers according to the expected transmit order.

7. The MIMO test receiver of claim 6 comprising an equalizer coupled to the signal reorder function for equalizing the subcarriers.

8. The MIMO test receiver of claim 7 comprising a plurality of inverse CSD units for decoding the frequency domain symbols carried by the subcarriers output by the equalizer.

9. The MIMO test receiver of claim 1 wherein the signal order detection and reorder function is configured to output a reorder indication to transmit chains of a MIMO transmitter for instructing the transmit chains as to how to reorder the MIMO signals.

10. The MIMO test receiver of claim 1 wherein the signal order detection and reorder function is configured to output a misorder alert indicating misordering of the RF cables.

11. The MIMO test receiver of claim 1 wherein the MIMO signals are misordered due to erroneous connection of the RF cables between the MIMO test receiver and a MIMO transmitter.

12. A method for automatically reordering signals transmitted by a multiple input multiple output (MIMO) transmitter, the method comprising:
    receiving, by a plurality of receive processors, MIMO signals transmitted over radio frequency (RF) cables and for converting the signals to a corresponding plurality of baseband signals;
    converting, using a plurality of fast Fourier transform (FFT) units, the corresponding plurality of baseband signals into frequency domain symbols carried on frequency domain subcarriers; and
    determining an order in which the MIMO signals were transmitted over the RF cables and automatically reordering the frequency domain subcarriers according to an expected transmission order.

13. The method of claim 12 wherein determining an order in which the MIMO signals were transmitted includes estimating an incremental phase shift of the subcarriers output by the FFT units.

14. The method of claim 13 wherein estimating the incremental phase shifts includes detecting known data patterns in the subcarriers.

15. The method of claim 14 wherein the known data patterns comprise long training field (LTF) patterns.

16. The method of claim 13 comprising utilizing the incremental phase shifts as estimates of cyclic shift delays (CSDs) of the frequency domain subcarriers.

17. The method of claim 13 wherein determining the order in which the MIMO signals were transmitted includes using the incremental phase shifts to determine the order.

18. The method of claim 17 comprising equalizing the subcarriers.

19. The method of claim 18 comprising decoding the frequency domain symbols carried by the subcarriers.

20. The method of claim 12 comprising outputting a reorder indication to transmit chains of a MIMO transmitter for instructing the transmit chains as to how to reorder the MIMO signals.

21. The method of claim 12 comprising generating and outputting a misorder alert indicating misordering of the RF cables.

22. The method of claim 12 wherein the MIMO signals are misordered due to erroneous connection of the RF cables between the MIMO test receiver and a MIMO transmitter.

23. A non-transitory computer readable medium having stored thereon executable instructions that when executed by a processor of a computer control the computer to perform steps comprising:
    receiving, by a plurality of receive processors, MIMO signals transmitted over radio frequency (RF) cables and converting the signals to a corresponding plurality of baseband signals;
    converting, using a plurality of fast Fourier transform (FFT) units, the corresponding plurality of baseband signals into frequency domain symbols carried on frequency domain subcarriers; and
    determining an order in which the MIMO signals were transmitted over the RF cables and automatically reordering the frequency domain subcarriers according to an expected transmission order.

* * * * *